(No Model.)

J. C. VETTER.
GALVANIC BATTERY.

No. 403,802. Patented May 21 1889.

WITNESSES:
Raymond F. Barnes
Frank C. Gruen

INVENTOR,
Joseph C. Vetter.
BY
ATTORNEY

UNITED STATES PATENT OFFICE.

JOSEPH C. VETTER, OF NEW YORK, N. Y.

GALVANIC BATTERY.

SPECIFICATION forming part of Letters Patent No. 403,802, dated May 21, 1889.

Application filed August 18, 1888. Serial No. 283,153. (No model.)

*To all whom it may concern:*

Be it known that I, JOSEPH C. VETTER, a citizen of the United States, residing in the city, county, and State of New York, have invented certain new and useful Improvements in Galvanic Batteries, of which the following is a specification.

The invention relates to galvanic batteries, with particular reference to sal-ammoniac or Leclanché batteries.

The primary object of the invention is to provide a battery of this general class which shall be of simple and compact construction, easily and conveniently handled without danger of spilling the contents, and which will be admirably adapted for use as a medical battery.

Figure 1:
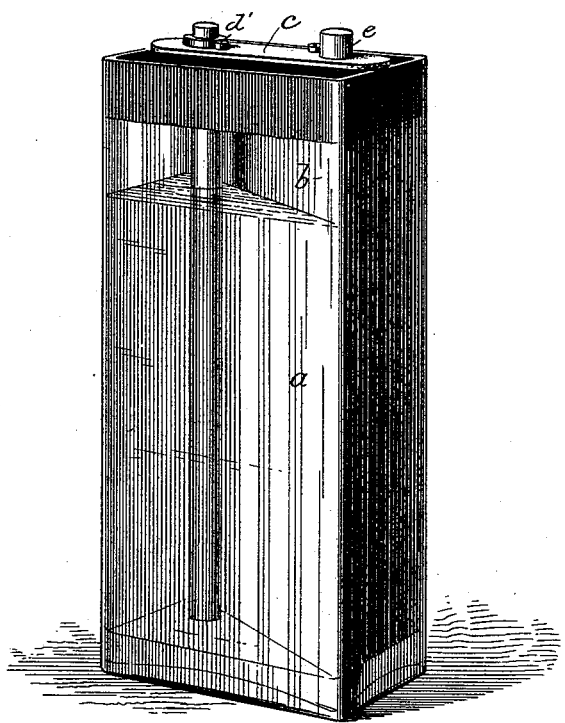
Figure 2:
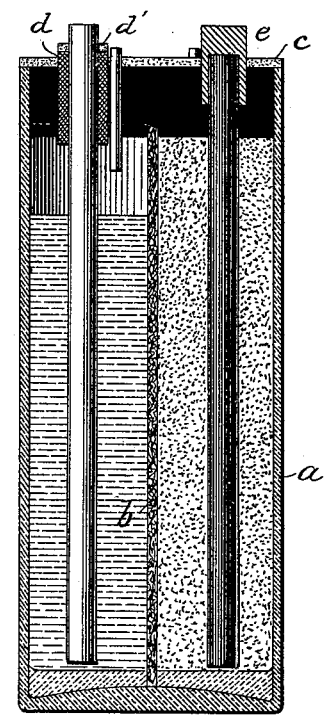
Figure 3:
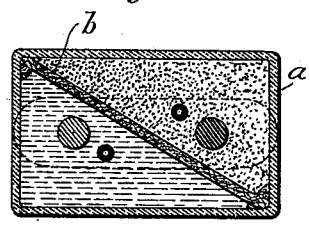
Figure 4:
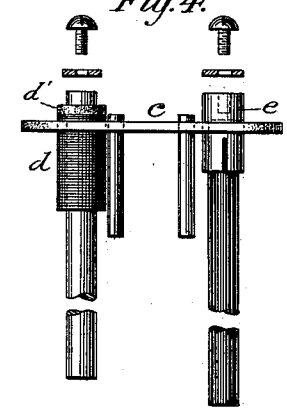

In the accompanying drawings, which form a part of this specification, Figure 1 represents a perspective view of the battery-cell; Fig. 2, a vertical section thereof; Fig. 3, a horizontal section taken along line $xx$ of Fig. 2; and Fig. 4 is a detail of a holder or bracket carrying the positive and negative electrodes.

$a$ represents the jar or vessel containing the elements of the battery. It is preferably constructed of glass in order that the contents of the cell may be observed at any time. I do not, however, confine myself to glass, as any of the well-known materials for this purpose may be utilized. The cell, as shown, is rectangular, but may be of any shape, and is divided into two chambers or compartments by a porous partition, $b$. I construct the partition of wood pulp, that being the best material for the purpose known to me. However, straw-board or other similar material may be used. The partition rests upon the bottom and extends to within a short distance of the top of the cell. After it has been properly inserted in the cell I place a small quantity of paraffine or other wax in the bottom of the cell. This helps to seal the partition in and calks it to prevent communication between the chambers across the bottom. The vertical edges of the partition may also be sealed in the same manner. By this use of paraffine I am not confined to the use of jars having symmetrically-formed sides and bottoms, irregular portions being leveled off by the paraffine.

The positive and negative electrodes are supported by a transverse guide-strip of insulating material, $c$. This strip is comparatively narrow and rests upon the edges of the jar. It is also secured in place in a manner which will be described hereinafter. I make this strip of insulating material of any kind, and stamp or punch holes in it to receive the electrodes of the battery and also the vent-tubes. The strip is provided with a sleeve, $d$, and thimble $e$. The sleeve $d$ is of rubber or other insulating material, and the thimble or cap $e$ is of metal. The guide-strip also carries two short fine tubes, which serve as vents for the escaping gases. The positive or zinc element in the form of a pencil passes down through the rubber sleeve $d$, and the extent of its immersion is limited by a collar, $d'$. The thimble $e$ is slit in order to spring over the end of the negative or carbon pencil element, and thereby hold it in position. The top of the thimble is left flat and bright in order that a contact may be secured. The thimble therefore serves the double purpose of supporting the pencil-carbon and supplying good means of connection. The guide-strip is placed upon the top of the jar so that one of the vent-tubes and one of the electrodes will be in each of the chambers of the cell.

The chamber containing the carbon pencil is filled with granulated carbon, while into the other chamber is placed the sal-ammoniac solution. In putting the parts of the cell together, the granulated carbon is put into its chamber and the strip, with the two pencils in position, is laid across the top. I then fill the upper part of the cell completely with pitch, wax, or cement, which takes hold of the strip and the sleeves and holds them in position.

For my own purpose I do not require binding-posts or any means for making connections with the cell, except flat metallic surfaces on the upper ends of the electrodes. For this reason I have provided the adjustable collar $d'$ on the zinc electrode, which holds in place by friction, but may be adjusted in its position so that the upper surface of the electrode shall be perfectly level with the upper end of the thimble holding the carbon. At the same time the drawings show screws and washers which may fit into the top of the sleeve *e* and the zinc to make wire-connections. The collar *d'* also prevents the zinc from striking the bottom of the cell.

It will be seen from the above description that I have provided a very compact, uniform, and cheap cell. It is also portable without fear of spilling the contents.

Having now described my invention, I claim—

1. A battery-cell having a partition extending from side to side of porous material, said partition being sealed in at the bottom with paraffine or other wax.

2. A battery-cell having a partition of porous material, said partition being sealed in at the bottom and top by wax or cement.

3. A battery-cell divided into two chambers by a partition of porous material, in combination with a frame or plate supporting the positive and negative electrodes and a pair of ventilating-tubes, one of said electrodes and one of said tubes extending down into each chamber, as described.

4. In a battery-cell, the plate *c*, provided with sleeve *d* and metallic thimble or cap *e*, and the vent-tubes, in combination with the positive and negative electrodes.

5. The combination, with the plate *c*, of the metallic cap or sleeve *e*, having spring-jaws for grasping one of the electrodes.

6. The combination, with the battery-cell, of the plate or frame *c*, resting upon the edge of the cell, and the sealing-block of cement or pitch for closing the mouth of the cell and securing said plate in position.

7. The insulating strip or plate *c*, provided with the perforations through which pass the carbon and zinc elements and the vent-tubes, as set forth.

In testimony whereof I have hereunto signed my name in the presence of two subscribing witnesses.

JOSEPH C. VETTER.

Witnesses:
WM. A. ROSENBAUM,
F. C. GRUEN.